US012276933B2

(12) United States Patent
Zhang

(10) Patent No.: US 12,276,933 B2
(45) Date of Patent: Apr. 15, 2025

(54) CONSUMABLE CHIP AND IMAGING FORMING CONTROL METHOD

(71) Applicant: Zhuhai Pantum Electronics Co., Ltd., Zhuhai (CN)

(72) Inventor: Hao Zhang, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/186,392

(22) Filed: Mar. 20, 2023

(65) Prior Publication Data

US 2023/0259061 A1 Aug. 17, 2023

Related U.S. Application Data

(63) Continuation of application No. PCT/CN2021/120624, filed on Sep. 26, 2021.

(30) Foreign Application Priority Data

Sep. 28, 2020 (CN) ......................... 202011041998.1

(51) Int. Cl.
*G03G 15/00* (2006.01)
*G03G 15/02* (2006.01)
*G03G 15/08* (2006.01)

(52) U.S. Cl.
CPC ......... *G03G 15/80* (2013.01); *G03G 15/0216* (2013.01); *G03G 15/0865* (2013.01); *G03G 2215/025* (2013.01); *G03G 2215/066* (2013.01)

(58) Field of Classification Search
USPC ............................................................ 399/90
See application file for complete search history.

(56) References Cited

U.S. PATENT DOCUMENTS

2015/0089630 A1 3/2015 Lee
2017/0230540 A1* 8/2017 Sasaki ..................... G06F 21/44

FOREIGN PATENT DOCUMENTS

CN 101782739 A 7/2010
CN 101954791 A 1/2011

(Continued)

OTHER PUBLICATIONS

Computer Translation of cited document CN 108804953A to Weixin et al. (Year: 2018).*

(Continued)

*Primary Examiner* — Quana Grainger
(74) *Attorney, Agent, or Firm* — ANOVA LAW GROUP, PLLC

(57) ABSTRACT

The present disclosure relates to a consumable chip, a consumable, an image forming device, and an image forming control method. The consumable chip is detachably installed on the consumable, and the consumable is detachably installed on the image forming device. The consumable chip includes a chip control unit, and the chip control unit is used to obtain a response signal based on a query signal, and process the response signal based on a preset rule to generate verification data, and the verification data is used to determine whether the consumable is a consumable that meets the preset requirement. The consumable chip generates verification data by processing the response signal according to preset rules, so that the verification data received by the image forming device includes both the response signal and auxiliary verification data obtained according to the response signal, thereby improving the verification reliability of forming device on consumable chip.

11 Claims, 7 Drawing Sheets

(56) References Cited

FOREIGN PATENT DOCUMENTS

| | | | |
|---|---|---|---|
| CN | 104866253 | A | 8/2015 |
| CN | 108804953 | A | 11/2018 |
| CN | 108819486 | A | 11/2018 |
| CN | 109977656 | A | 7/2019 |
| CN | 108804953 | B | 3/2020 |
| CN | 112099324 | A | 12/2020 |
| EP | 2863620 | A1 | 4/2015 |
| JP | 2011079217 | A | 4/2011 |
| JP | 2019109932 | A | 7/2019 |

OTHER PUBLICATIONS

Translation of CN 108804953B to Weixin et al. (Year: 2020).*

The World Intellectual Property Organization (WIPO) International Search Report for PCT/CN2021/120624 Jan. 6, 2022 7 Pages (including translation).

* cited by examiner

CONSUMABLE CHIP AND IMAGING FORMING CONTROL METHOD

RELATED APPLICATION(S)

This application is a continuation application of PCT Patent Application No. PCT/CN2021/120624 filed on Sep. 26, 2021, which in turn claims priority to Chinese Patent Application No. 202011041998.1, entitled "Consumable Chip, Consumable, Image Forming Device, and Image Forming Control Method" and filed with the National Intellectual Property Administration, PRC on Sep. 28, 2020, all of which are incorporated herein by reference in entirety.

FIELD OF THE TECHNOLOGY

The present disclosure relates to the field of printing technology, and in particular to a consumable chip, a consumable, an image forming device, and an image forming control method.

BACKGROUND

Consumables such as toner cartridges are detachably installed in image forming devices such as printers, and consumable chips are installed on the consumables. After the consumables are installed in the image forming device and before the image forming device uses the consumables for imaging, the image forming device detects whether the chips of the consumables meet the predetermined requirements, and only start to use the consumables for imaging if they meet the requirements. The controller of the image forming device sends a query signal to the consumable chip. When the response signal sent from the consumable chip matches the information stored in the memory of the image forming device, and the time of the response signal returned by the consumable chip meets the requirement, it is determined that the consumable meets the preset requirement.

However, due to the influence of the electrostatic field in the image forming device and the contact conditions between the image forming device and the consumable chip (including the size, shape, and material of the contact surface), the communication between the image forming device and the consumable is often disturbed, which makes the reliability of the response signal returned by the consumable chip. As a result, consumables that do not meet the preset requirements may be erroneously as meeting the preset requirements, and the use of consumables that do not meet the preset requirements may damage the image forming device and print quality, causing inconvenience to users.

Certain existing methods of determining whether consumables meet preset requirements are not very reliable, and it is desirable to improve the reliability on determining whether consumables meet requirements.

SUMMARY

It is desirable to provide a consumable chip, a consumable, an image forming device, and an image forming control method to solve the technical problem on how to make more reliable the method of determining whether a consumable meets a preset requirement.

In a first aspect, the present disclosure provides a consumable chip. The consumable chip is detachably installed on a consumable, and the consumable is detachably installed on an image forming device. The consumable chip includes: a chip control unit, configured to obtain a response signal according to a query signal, and to process the response signal according to a preset rule to generate verification data, and the verification data is used to determine whether the consumable meets a preset requirement.

In a second aspect, the present disclosure provides a consumable, including: a housing; a developer container, located in the housing, for containing a developer; and the consumable chip provided according to the first aspect.

In a third aspect, the present disclosure provides a consumable. The consumable includes: a photosensitive drum; a charging roller for charging the photosensitive drum; and the consumable chip provided according to the above-mentioned first aspect.

In a fourth aspect, the present disclosure provides an image forming device. The image forming device includes a consumable, the consumable having a consumable chip installed thereon; and an image forming control unit, configured to send a query signal to a consumable chip, and receive verification data generated by the consumable chip through processing of the response signal based on the query signal according to preset rules, and determine whether the consumable meets the preset requirements based on the verification data.

The above-mentioned image forming device receives the verification data generated through processing of the response signal based on the query signal by the consumable chip according to the preset rules, thereby determining whether the consumable is a consumable that meets the preset requirements. Since the verification data includes both the response signal and the auxiliary verification data obtained according to the response signal, the image forming device can reliably verify the consumable.

In a fifth aspect, the present disclosure provides an image forming control method, applied to an image forming device and a consumable chip, where the image forming device is detachably installed with a consumable, the consumable is installed with the chip, characterized in that, the image forming device includes an image forming control unit, the method including: the image forming control unit sends a query signal to the consumable chip; the consumable chip obtains a response signal based on the query signal, processes the response signal according to a preset rule to generate verification data, and sends the verification data to the image forming control unit; the image forming control unit determines whether the consumable is a consumable satisfying a preset requirement based on the verification data.

In the above-mentioned image forming control method, the verification data is generated by processing the response signal according to preset rules, so that the verification data received by the image forming device includes both the response signal and auxiliary verification data obtained according to the response signal, thereby improving the reliability and flexibility on consumable chip verification by image forming devices.

DETAILED DESCRIPTION

Figure 1:
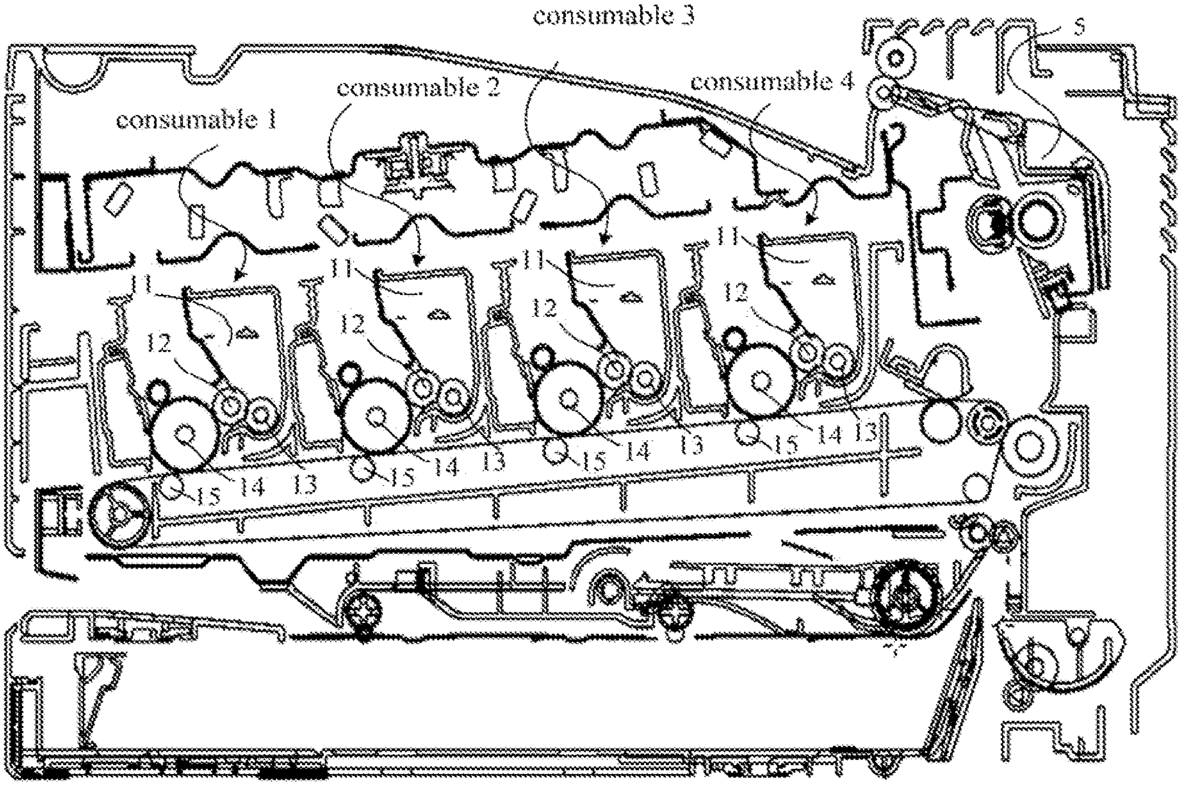
FIG. 1 is a schematic structural diagram of an image forming device according to certain embodiment(s) of the present disclosure.

To make clearer the purpose, technical solution and advantages of the present disclosure, description is provided in conjunction with the accompanying drawings and embodiments. Embodiments described herein are used to explain the present disclosure, and are not intended to limit the present disclosure.

In the description of present disclosure, unless otherwise clearly specified and limited, the terms "first" and "second" are only used for the purpose of description, and does not indicate or imply order of importance; unless otherwise clearly specified or stated, the term "plurality" refers to two or more; the terms "connection", "fixation" or the like is understood in a broad sense, for example, "connection" may be a fixed connection, a detachable connection, an integrated connection, or an electrical connection, either directly or indirectly through an intermediary. Those of ordinary skill in the art understands the meanings of the terms of the present disclosure.

In the description of the present disclosure, orientation words such as "upper" and "lower" are described from the perspective shown in the drawings, and is not to be interpreted as restriction to the description. Furthermore, when it is mentioned that an element is connected "on" or "under" another element, it may not only be directly connected "on" or "under" another element, but also be indirectly connected "on" or "under" another element through an intervening element.

The present disclosure in certain embodiment(s) relates to the communication between a an image forming device and a consumable chip of a consumable. Both the body side of the image forming device and the chip side include electrical contacts. When the consumable is installed onto the image forming device, the electrical contacts at the body side of the image forming device are in contact with the electrical contacts on the chip side, where the electrical contacts may be conductive planes, conductive probes, conductive coils, or the like. To facilitate the distinction, the electrical contact portion on the chip side is referred to as a terminal, and the electrical contact portion on the image forming device side is referred to as a pin.

The image forming device is used to perform image forming jobs such as generating, printing, receiving, and transmitting image data. Examples of the image forming apparatus include: inkjet printers, laser printers, LED (Light Emitting Diode) printers, copiers, scanners, all-in-one fax machines, and multi-function peripheral (MFP) machines that perform multiple functions in a single device. The image forming device includes a controller and an image forming unit. The controller controls the image forming device in a whole, and the image forming unit forms an image on conveyed paper based on image data under the control of the controller.

FIG. 1 is a schematic structural view of an image forming device provided according to certain embodiment(s) of the present disclosure. As schematically shown in FIG. 1, image forming parts of an image forming device may include: a developer container 11, a developing member 12, a developer feeding member 13, a photosensitive member 14, a transfer member 15, and a fixing assembly 5. The paper to be printed moves in the direction of paper feeding. After successively passing through the powder feeding operation of the developer feeding member 13 and the developing operation of the developing member 12, the paper reaches the nip area between the photosensitive member 14 and the transfer member 15 for transfer. The paper is fixed through the fixing assembly 5 to complete the image forming operation. The developer container 11 is used to accommodate the developer, and the developer may be materials such as toner, carbon powder, or the like. The photosensitive member 14 includes a photosensitive drum (OPC, Organic Photoconductor) and a charging roller, where the charging roller is used for charging the photosensitive drum. The developing member 12 includes components such as a developing roller, which are used to deliver developer to the photosensitive drum. The developer feeding member 13 includes elements such as powder feeding rollers, which may also be replaced with elements such as powder feeding screws, and is used to convey the developer to the developing member 12.

The image forming device is detachably installed with at least one consumable. Taking the image forming device shown in FIG. 1 as an example, the image forming device is detachably installed with four consumables, namely consumable 1, consumable 2, consumable 3, and consumable 4 shown in FIG. 1, where the four consumables are respectively used for providing to the image forming device color black K developer, color cyan C developer, color magenta M developer, and color yellow Y developer. In certain embodiment(s), the number of consumables installed in the image forming apparatus may be increased or decreased, for example, 1 or 6, or the like. The present disclosure does not limit on the color type or total number of the consumables.

In certain embodiment(s), the consumable chip is or includes a circuit substrate mounted on the consumable, and the circuit substrate includes a storage device and a contact terminal connected to the storage device, and the contact terminal is used for point-to-point connection with pins on the image forming device side.

In certain embodiment(s), and for the consumable with the consumable chip installed, the consumable may only include the developer container 11.

In certain embodiment(s), the consumable is of a split structure. For example, the consumable (1, 2, 3 or 4) includes a developing cartridge and a drum cartridge that may be disassembled from each other. The developing cartridge includes a housing, a developer container 11, a developing member 12, and/or a developer feeding member 13. The drum cartridge includes a photosensitive member 14, which may include a photosensitive drum and a charging roller.

In certain embodiment(s), the consumable is or includes a developing cartridge.

In certain embodiment(s), the consumable is or includes a drum cartridge.

In certain embodiment(s), the consumable is an integrated structure, for example, the consumable (1, 2, 3 or 4) includes a developer container 11, a developing member 12, a developer feeding member 13, and a photosensitive member 14.

In certain embodiment(s), the consumable may be other components, parts, and units in the image forming device that are easily damaged and replaced, such as cartons, which also belong to the corresponding technical solutions of the consumables protected in the present disclosure.

Figure 2:
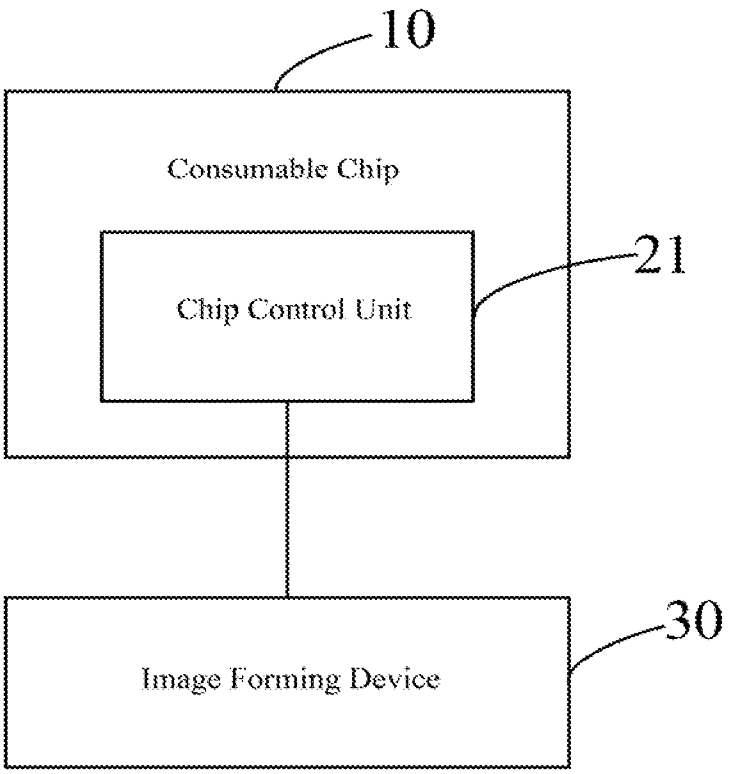
FIG. 2 is a schematic diagram of a connection between a consumable chip and an image forming device according to certain embodiment(s) of the present disclosure.

In view of FIG. 2, the present disclosure in certain embodiment(s) provides a consumable chip 10, the consumable chip 10 may be detachably installed on the consumable, and the consumable in turn may be detachably installed on the image forming device 30. The consumable chip 10 includes a chip control unit 21, the chip control unit 21 is used to obtain a response signal based on a query signal sent by the image forming device 30, and process the response signal based on a preset rule to generate verification data, so that the image forming device 30 determines whether to use the consumable for imaging based on the verification data, that is, the verification data is used to determine whether the consumable meets one or more preset requirements.

The consumable chip 10 is used to store the information related to the consumable, and functions for identification and status recording. After the consumable is installed in the image forming device 30 and before the image forming device 30 uses the consumable to perform imaging, the image forming device 30 sends the query signal to the consumable chip 10, the consumable chip 10 obtains the response signal based on the query signal, and processes the response signal based on one or more preset rules to generate the verification data. The image forming apparatus 30 determines whether the consumable meets preset requirements based on the verification data, thereby determining whether to use the consumable for imaging. The response signal may be information related to identification, such as the model, manufacturer, or serial number of the consumable.

The chip control unit 21 may be connected to the image forming device 30 through the communication bus, and data transmission may be performed between the chip control unit 21 and the image forming device 30 through the communication bus. The chip control unit 21 and the image forming device 30 may obtain via the communication bus information sent by the chip control unit 21 and by the image forming device 30.

The response signal is stored in the consumable chip 10, and the chip control unit 21 may obtain the response signal stored in the consumable chip 10. The response signal corresponds to the query signal, and the consumable chip 10 may store response signals corresponding to different query signals. In certain embodiment(s), the consumable chip 10 stores a look-up table representing the correspondence between query signals and response signals. From the query signal received from the image forming apparatus 30 and in view of the look-up table, the response signal corresponding to the query signal is determined by the chip control unit 21 of the consumable chip 10. The correspondence may alternatively be stored in the computer program included in the consumable chip 10.

In certain embodiment(s), different response signals correspond to different preset rules for processing the response signal, that is, the consumable chip 10 may store a correspondence between response signals and preset rules. The consumable chip 10 may alternatively store a correspondence among the response signals, the preset rules, and the query signals.

The consumable chip 10 generates verification data by processing the response signal according to preset rule, so that the verification data received by the image forming device 30 includes both the response signal and auxiliary verification data obtained according to the response signal. Accordingly, verification of the consumable chip 10 by the image forming device 30 is provided with improved reliability.

Figure 3:
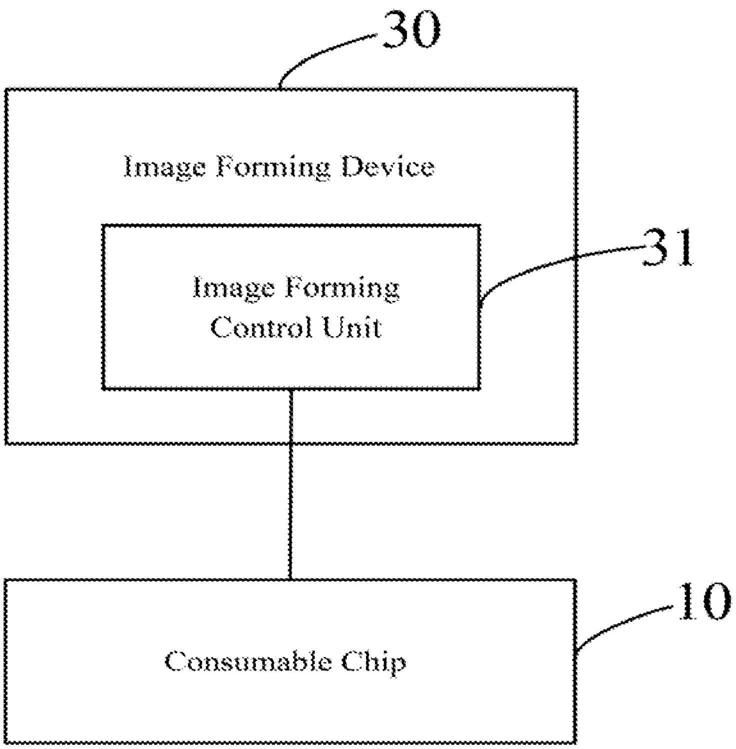
FIG. 3 is a schematic diagram of a connection between a consumable chip and an image forming device according to certain embodiment(s) of the present disclosure.

In view of FIG. 3, the present disclosure in certain embodiment(s) provides an image forming device 30, the consumable is installed on the image forming device 30, and the consumable chip 10 is installed on the consumable. The image forming device 30 includes an image forming control unit 31, and the image forming control unit 31 is used to send a query signal to the consumable chip 10, receive the verification data generated through processing the response signal by the consumable chip 10 based on the preset rule, determine whether the consumable meets the preset requirements based on the verification data, and determine whether to use the consumable for imaging.

In certain embodiment(s), the response signal includes N-bit data bits, and the chip control unit 21 is configured to increase the number of each bit of N-bit data bits to M bits, and arrange the N*M-bit data bits in a preset arrangement to generate the verification data.

For example, the response signal has 3 data bits and is 123, the chip control unit 21 may increase the data bits 1, 2 and 3 of the data bit 123 to 2 bits respectively, and according to the 3*2 data bits, arrange the data bit 1, arrange the data bit 2, and arrange the data bit 3 to get the verification data 112233. For another example, the chip control unit 21 may increase each data bit 1, 2 and 3 to 3 bits respectively, and arrange the 3*3 data bits with the data bit 123 as a cycle to obtain the verification data 123123123. For another example, the chip control unit 21 may increase the data bits 1, 2 and 3 of each bit to 3 bits respectively, and arrange the 3*3 data bits with the data bit 321 as a cycle to obtain the verification data 321321321. For yet another example, the verification data that may be generated according to the preset arrangement may be 312312312. The present disclosure does not intent to limit on the types of the preset arrangement or the structure of the verification data.

By processing the number and sequence of data bits of the response signal, the auxiliary verification data is generated and integrated into the response signal, in the process of generating the verification data. After receiving the verification data, the image forming device 30 examines the response signal, and examines the auxiliary verification data, thereby improving the reliability of the verification of the consumable chip 10 by the image forming device 30.

After receiving the verification data sent by the chip control unit 21, the image forming control unit 31 parses the verification data to obtain parsed data in which N*M bits of data are arranged according to a preset arrangement, and compared the parsed data with preset parsed data. When the analysis data is consistent with the preset analysis data, the image forming control unit 31 determines to use the consumable for imaging, that is, the image forming control unit 31 is used to determine that the consumable is a consumable that meets the preset requirements.

The image forming device 30 determines the preset parsing rule for the verification data based on the query signal, and parses the verification data according to the preset parsing rule to obtain the parsed data where N*M data bits are arranged according to the preset arrangement. The image forming device 30 also determines the preset parsed data based on the query signal, and compares the parsed data with the preset parsed data. When the parsed data is consistent with the preset parsed data, it is determined that the consumable meets the preset requirements, the consumable meets the preset requirement(s), and the consumable is determined for use in imaging. The query signal, the preset parsing rule and the preset parsed data may be pre-stored in the image forming device 30. Alternatively, and before the parsed data is compared with the preset parsed data, the image forming control unit 31 may generate the preset parsed data according to the query signal and the preset parsing rule. When the response signal is processed correctly by the consumable chip 10 and transmission of the verification data from the consumable chip 10 to the image forming control unit 31 is not in error, the image forming control unit 31 analyzes the verification data, and the parsed data as obtain is consistent with the preset parsed data. The image forming control unit 31 thus determines that the consumable is a consumable that meets the preset requirement, thereby determining the consumable to be used for imaging.

By processing the number and sequence of data bits of the response signal, it is equivalent to adding auxiliary verification data to the response signal to generate verification data. After receiving the verification data, the image forming device 30 verifies the response signal, and verifies the auxiliary verification data, thereby improving the reliability of the verification of the consumable chip 10 by the image forming device 30.

The chip control unit 21 may be configured to acquire first time information when the query signal is received, and determine second time information for sending the verification data to the image forming device 30 according to the first time information.

The first time information is a clock signal generated by the image forming device 30 according to a time value requirement for sending the query signal. The second time information is a time signal calculated by the chip control unit 21 according to a preset algorithm based on the first time information.

The first time information includes first transmission time at which each byte of binary data in the query signal is received, and includes second transmission time at which two adjacent bytes in the binary data in the query signal are received. The second time information includes third transmission time at which each byte of the binary data in the verification data is transmitted from the chip control unit 21 to the image forming device 30, and includes fourth transmission time at which two adjacent bytes in the binary data in the verification data are transmitted from the chip control unit 21 to the image forming device 30.

The second time information for sending the verification data to the image forming device 30 is determined based on the first time information. In certain embodiment(s), the second time information is the same as the first time information. Alternatively, the second time information is calculated and determined based on the first time information according to a certain algorithm.

The chip control unit 21 obtains the first time information of the received query signal, processes the first time information to obtain the second time information, and adds the second time information into the verification data, so that the image forming device 30 may also verify the consumable according to the second time information, further elevating the reliability of the verification of the consumable chip 10 by the image forming device 30.

The image forming control unit 31 is configured to generate first time information when the query signal is sent, and for receiving second time information when the verification data is sent from the consumable chip 10. The image forming control unit 31 is further configured to compare the second time information with preset second time information. When the parsed data is consistent with the preset parsed data and the second time information is consistent with the preset second time information, the image forming control unit 31 determines that the consumable is a consumable that meets the preset requirement, so that the image forming control unit 31 identifies the consumable for imaging. In certain embodiment(s), the preset second time information may be the same as the first time information, that is, the image forming device 30 judges whether the time information corresponding to the sending of the query signal is consistent with the time information corresponding to receiving the verification data, and when they are consistent, the consumable is determined to have met the preset requirement, and is to be used for imaging. Alternatively, the preset second time information may also be calculated and generated by the image forming control unit 31 based on the first time information according to a certain algorithm. When the image forming device 30 determines that the time information of the received verification data satisfies the preset requirement, the consumable is determined to have met the preset requirement and is to be used for imaging. Once the parsed data is verified to be correct, the image forming control unit 31 may further verify the second time information at which the verification data is sent, thereby elevating the reliability on verification of the consumable chip 10.

In certain embodiment(s), the chip control unit 21 is configured to obtain the first time information corresponding to the query signal as received, and determine the verification data based on a preset algorithm, according to the response signal and the first time information.

In certain embodiment(s), the chip control unit 21 processes the first time information and the response signal according to a preset algorithm to obtain verification data. The preset algorithm is any suitable calculation method in alignment with a communication protocol. The chip control unit 21 obtains the verification data by processing the response signal and the first time information according to the preset algorithm, and the image forming device 30 may concurrently verify the response signal and the first time information, thereby elevating the reliability of the image forming device 30's judgment that the consumable chip 10 meets the preset requirement.

The first time information includes the first transmission time of each byte of binary data in the received query signal and the second transmission time of two adjacent bytes of the binary data in the received query signal.

Figure 4:
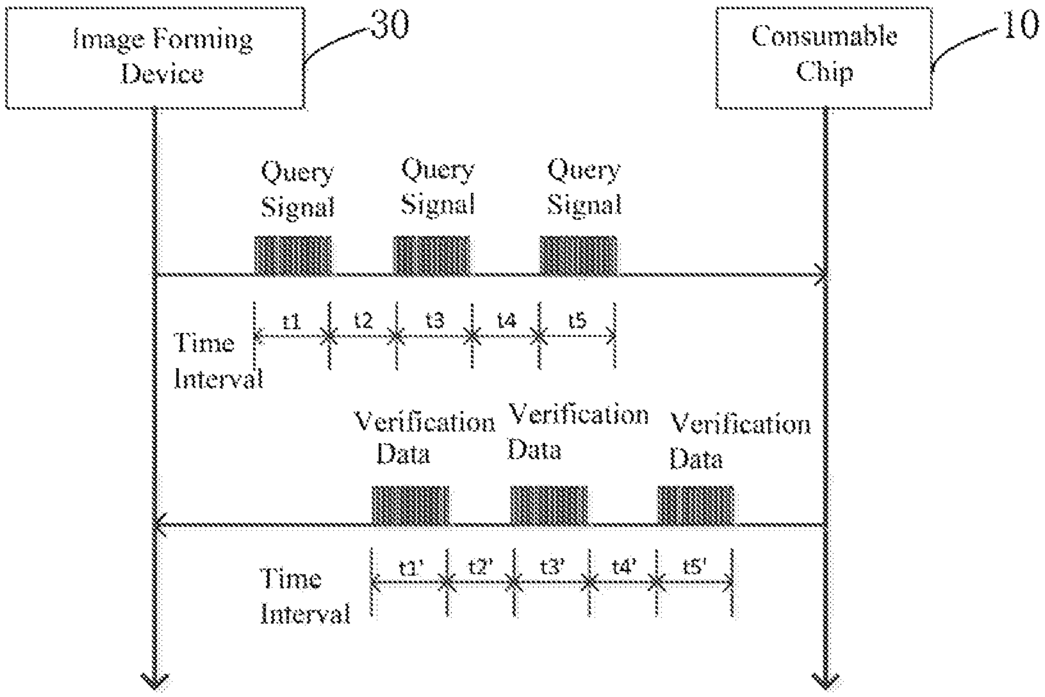
FIG. 4 is a schematic diagram of communication steps between a consumable chip and an image forming device according to certain embodiment(s) of the present disclosure.

In certain embodiment(s), and as shown in FIGS. 4, t1, t3, and t5 respectively indicate the first transmission time of each byte of binary data, and t2 and t4 respectively indicate the second transmission times of two adjacent bytes of binary data. t1', t2', t3', t4' and t5' indicate the second time information.

The image forming control unit 31 is configured to generate the first time information at which the query signal is sent, and to parse the verification data to obtain the response signal. The image forming control unit 31 is further configured to compare the response signal with the preset response signal, and to compare the first time information with the preset first time information. When the response signal is consistent with the preset response signal and the first time information is consistent with the preset first time information, the image forming control unit 31 determines that the consumable meets the preset requirement and is to be used for imaging.

When the verification data is obtained by the chip control unit 21 through processing the response signal and the first time information according to a preset algorithm, the image forming control unit 31 is used to compare the response signal with the preset response signal and compare the first time information with the preset first time information, and when the response signal is consistent with the preset response signal and the first time information is consistent with the preset first time information, the image forming control unit 31 determines that the consumable meets the preset requirement and is to be used for imaging.

In certain embodiment(s), the image forming control unit 31 not only verifies the response signal but also verifies the first time information, and when both are verified, that is, the response signal is consistent with the preset response signal and the first time information is consistent with the preset first time information, the image forming control unit 31 determines that the consumable meets the preset requirement. By concurrently verifying the content of the response signal and its corresponding time, the reliability of the image forming device 30's verification of the consumable is improved. The preset algorithm may be any suitable calculation algorithm.

In certain embodiment(s), the preset response signal and the preset first time information correspond to the query signal. The query signal, the preset response signal and the preset first time information may be pre-stored in the image forming device 30. Alternatively, and before comparing the response signal with the preset response signal and comparing the first time information with the preset first time information, the image forming control unit 31 may generate the preset response signal and the preset first time information according to the query signal.

In certain embodiment(s), when the verification data is obtained by the chip control unit 21 through processing the response signal and the first time information according to a preset algorithm, the image forming control unit 31 compares the calculation result of the response signal and the first time information with the preset calculation result. When the calculation result is consistent with the preset calculation result, the image forming control unit 31 determines that the consumable is a consumable that meets the preset requirements, thereby determining that the consumable is used for imaging. In certain embodiment(s), the chip control unit 21 is configured to send verification data to the image forming device 30 based on a preset clock signal and preset time information.

The verification data includes multiple data bits. The preset clock signal includes multiple clock cycles, and each clock cycle includes an ascending edge and a descending edge. Each data bit corresponds to a high level signal or a low level signal. The preset time information includes a first preset time and a second preset time, where the first preset time is an extension time corresponding to a hold time of the high level signal, and the second preset time is an extension time corresponding to a hold time of the low level signal. The first preset time is less than the time between the descending edge of the current clock cycle and the ascending edge of the next clock cycle. The second preset time is less than the time between the descending edge of the current clock cycle and the ascending edge of the next clock cycle time. The chip control unit 21 may obtain the verification data by extending the high level hold time corresponding to the response signal for the first preset time and by extending the low level hold time for the second preset time, to obtain the verification data.

Figure 5:
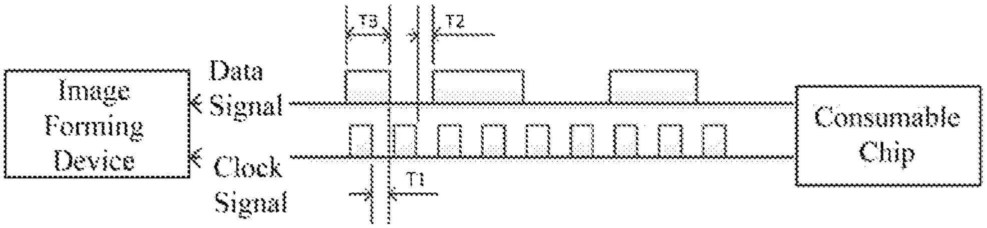
FIG. 5 is a schematic diagram of communication steps between a consumable chip and an image forming device according to certain embodiment(s) of the present disclosure.

In certain embodiment(s), and further in view of FIG. 5, the preset clock signal is generated by the image forming device 30. Each bit of data corresponds to a high level signal or a low level signal, and the verification data consists of multiple high level signals and multiple low level signals. The hold time of the high level signal and the hold time of the low level signal are T, as shown in FIG. 5, the extension time corresponding to the hold time of the high-level signal is T1, and the extension time corresponding to the hold time of the low-level signal is T2, that is, the first preset time and the second preset time are T1 and T2 respectively, and the hold time of the high level signal is extended to T3 after the first preset time. The hold time of the high level signal and the hold time of the low level signal are T, which is greater than the hold time of the preset clock signal, and less than one cycle of the preset clock signal.

The chip control unit 21 may read the query signal on the data bus at the ascending edge of the preset clock signal, thereby receiving the query signal sent by the image forming device 30. When the current query signal is at a high level, the data bit storing the query signal is "1", and when the current query signal is at a low level, the data bit storing the query signal is "0".

The chip control unit 21 may provide the verification data on the data bus at the descending edge of the preset clock signal, thereby sending the verification data to the image forming device 30. When the data bit of the verification data sent is "1", the current verification data is at a high level. When the data bit of the verification data sent is "0", the current verification data level is at a low level.

Extending the holding time of the high level signal by the first preset time is equivalent to providing one bit of data to the data bus after extending the first preset time on the descending edge of the preset clock signal. Extending the holding time of the low level signal by the second preset time is equivalent to providing one bit of data to the data bus after extending the second preset time on the descending edge of the preset clock signal.

The image forming device 30 may improve the reliability of the verification of the consumable chip 10 by measuring the level hold time of the received verification data.

The image forming control unit 31 is used to generate a preset clock signal for the consumable chip 10 to send the verification data and measure the level hold time of the verification data based on the preset clock signal to obtain measurement time information. The image forming control unit 31 is used to determine whether the measurement time information is correct, and when the measurement time information is correct, the image forming control unit 31 is used to parse the verification data and determine whether the consumable meets the preset requirement, thereby determining to use the consumable for imaging.

When the verification data is obtained by the chip control unit 21 through extending the high level hold time corresponding to the response signal for a first preset time and through extending the low level hold time corresponding to the response signal for a second preset time, the image forming control unit 31 measures the level hold time of the verification data, and verifies the measurement time information. When the measurement time information is correct, the image forming control unit 31 parses the verification data to obtain the response signal. When the response signal is correct, it is determined that the consumable is a consumable that meets the preset requirement, and is to be used for imaging.

The measurement time information includes a third preset time and a fourth preset time, the third preset time is the extension time corresponding to the hold time of the high level signal, and the fourth preset time is the extension time corresponding to the hold time of the low level signal time.

When the measurement time information is correct, the image forming control unit parses the verification data to obtain the response signal. When the measurement time information is correct and the response signal is correct, the image forming control unit determines that the consumable is a consumable that meets the preset requirement and is to be used for imaging, otherwise, proceeds to follow-up steps on communication errors.

By first verifying the time information and then verifying the content of the response signal, it is possible to achieve double verification of consumables and to improve the reliability of consumables' verification.

The consumable chip 10 generates verification data by processing the response signal according to preset rule, so that the verification data received by the image forming device 30 includes both the response signal and auxiliary verification data obtained according to the response signal. Therefore, the reliability of the verification of the consumable chip 10 by the image forming device 30 may be improved.

The image forming device 30 receives the verification data generated by the consumable chip 10 through processing the response signal according to the preset rule, and processes the verification data, thereby determines whether to use the consumable for imaging. Because the verification data includes not only the response signal but also the auxiliary verification data generated according to the response signal, the image forming device 30 may reliably verify the consumables.

The present disclosure in certain embodiment(s) provides a consumable, which includes a housing, a developer container, and the consumable chip 10 described herein. The developer container is located in the housing for containing the developer. The consumable chip 10 is configured on the housing.

In certain embodiment(s), the consumable further include a developer feeding member for conveying the developer.

In certain embodiment(s), the consumable includes a photosensitive drum and a charging roller, and the charging roller is used to charge the photosensitive drum.

The present disclosure in certain embodiment(s) provides a consumable, which includes a photosensitive drum, a charging roller, and a consumable chip 10. The charging roller is used to charge the photosensitive drum. The consumable chip 10 is the consumable chip 10 described herein.

The consumable generates verification data by processing the response signal according to the preset rule, so that the verification data received by the image forming device 30 includes both the response signal and auxiliary verification data obtained according to the response signal, thereby elevating the reliability of the image forming device 30's verification of the consumable chip 10.

Figure 6:
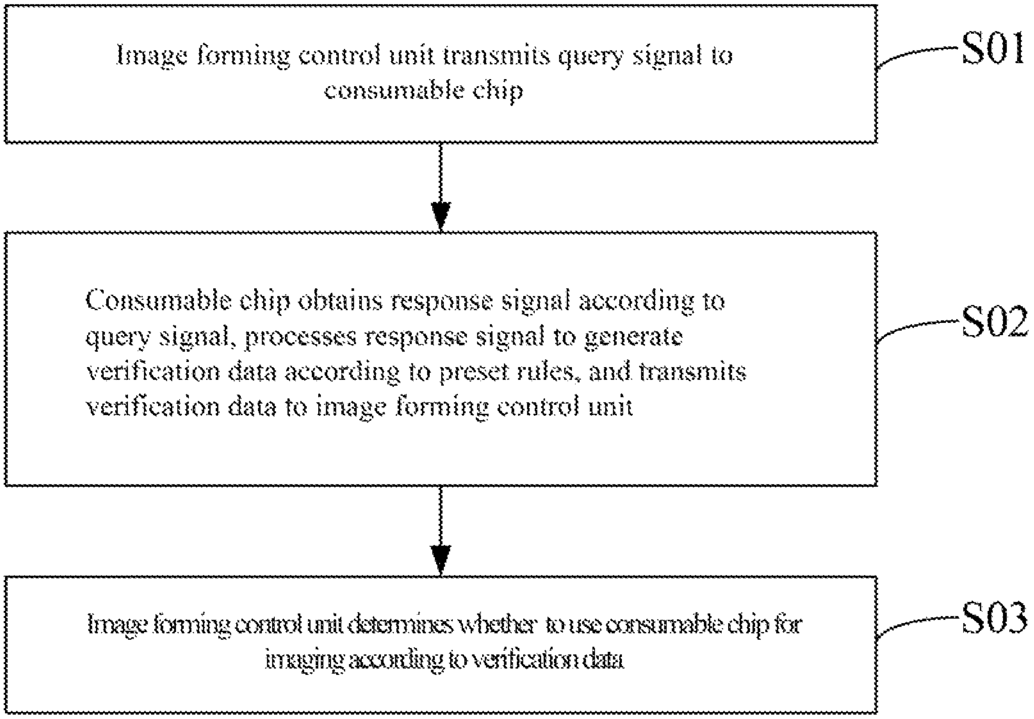
FIG. 6 is a schematic flowchart of an image forming control method according to certain embodiment(s) of the present disclosure.

In view of FIG. 6, the present disclosure in certain embodiment(s) provides an image forming control method, applied to an image forming device and a consumable chip. The image forming device is detachably installed with the consumable, one or more chips are installed on the consumable, and the image forming device includes an image forming control unit. The image forming control method includes:

S01. The image forming control unit sends a query signal to the consumable chip.

S02. The consumable chip acquires a response signal based on the query signal, processes the response signal based on a preset rule to generate verification data, and sends the verification data to the image forming control unit.

S03. The image forming control unit determines whether to use the consumable for imaging according to the verification data.

In S03, the image forming control unit may also determine whether the consumable meet the preset requirement according to the verification data, and if so, determine to use the consumable for imaging.

In certain embodiment(s), the response signal includes N bits of data, and the consumable chip's processing the response signal based on the preset rule to generate verification data, and sending the verification data to the image forming control unit may include: increasing, by the consumable chip, the number of data bits per bit to M bits; and arranging, by the consumable chip, the N*M data bits according to a preset arrangement to generate the verification data.

Determining, by the image forming control unit, as to whether the consumable meets the preset requirement according to the verification data may include: parsing, by the image forming control unit, the verification data to obtain parsed data in which N*M bits are arranged according to a preset arrangement, and comparing the parsed data with preset parsed analysis data, when the parsed data is consistent with the preset parsed data, the image forming control unit's determining that the consumable satisfies a preset requirement, thereby determining that the consumable be used for imaging.

The consumable chip's processing the response signal according to a preset rule to generate verification data, and sending the verification data to the image forming control unit may include: acquiring, by the consumable chip, first time information at which the query signal is received, and determining, by the consumable chip, second time information for sending the verification data to the image forming device according to the first time information.

The image forming control unit's determining whether the consumable meets the preset requirement according to the verification data may include: generating, by the image forming control unit, the first time information for sending the query signal, and receiving the second time information for the verification data sent by the consumable chip; and comparing, by the image forming control unit, the second time information with the preset second time information, when the parsed data is consistent with the preset parsed data and the second time information is consistent with the preset second time information, the image forming control unit's determining that the consumable is a consumable that meets the preset requirement.

In certain embodiment(s), FIG. 4 schematically illustrates a handshake scene between an image forming device and a consumable chip.

The communication between the image forming device and the consumable chip is performed according to an agreed communication protocol. The image forming device sends the handshake data, that is, the query signal, to the data bus, and the consumable chip receives the handshake data, and at the same time acquires the first time information when the handshake data is received. The consumable chip parses, identifies and counts the content of the handshake data, and determines whether the content, type and count meets the communication protocol. When the content, type and count of the handshake data meet the communication protocol, the consumable chip obtains the response signal according to the handshake data, and increases the number of data bits per bit of the response signal to M bits, arranges the N*M data bits according to a preset arrangement to generate the verification data. The consumable chip also determines the second time information, according to the first time information, for sending the verification data to the image forming device. The image forming device receives the handshake data returned by the consumable chip, that is, the verification data and the second time information, and the image forming device performs content analysis, type identification and counting on the verification data, that is, the image forming control unit parses and analyses the verification data to obtain parsed data whose N*M data bits are arranged according to the preset arrangement method. The image forming device also determines whether the parsed data meets the restriction conditions of the communication protocol, that is, the image forming device compares the parsed data with the preset parsed data, and when the parsed data is in alignment with the restriction conditions of the communication protocol, it is determined that the hand shaking between the image forming device and the consumable chip is successful. The image forming device may also compare the second time information with the preset second time information, and when the parsed data is consistent with the preset parsed data and the second time information is consistent with the preset second time information, the handshake is performed. In certain embodiment(s), the content of the verification data and the corresponding time information may also be verified concurrently with the handshaking, to further elevate the reliability of data verification and the reliability of communication.

When the image forming device performs handshake communication with multiple types of consumable chips, the image forming device may identify and distinguish different types of consumable chips by verifying the content of the verification data and the corresponding time information.

In certain embodiment(s), the consumable chip's processing the response signal according to the preset rule to generate verification data, and sending the verification data to the image forming control unit may include: acquiring, by the consumable chip, first time information corresponding to the received query signal; and determining, by the consumable chip, verification data according to a preset algorithm according to the response signal and the first time information.

The image forming control unit's determining whether the consumable meets the preset requirement according to the verification data may include: generating, by the image forming control unit, the first time information for sending the query signal; and analyzing, by the image forming control unit, the verification data to obtain the response signal. The image forming control unit also compares the response signal with the preset response signal and compares the first time information with the preset first time information. When the response signal is consistent with the preset response signal and the first time information is consistent with the preset first time information, the image forming control unit determines that the consumable is a consumable that meets the preset requirements, thereby determining that the consumable be used for imaging.

Figure 7:
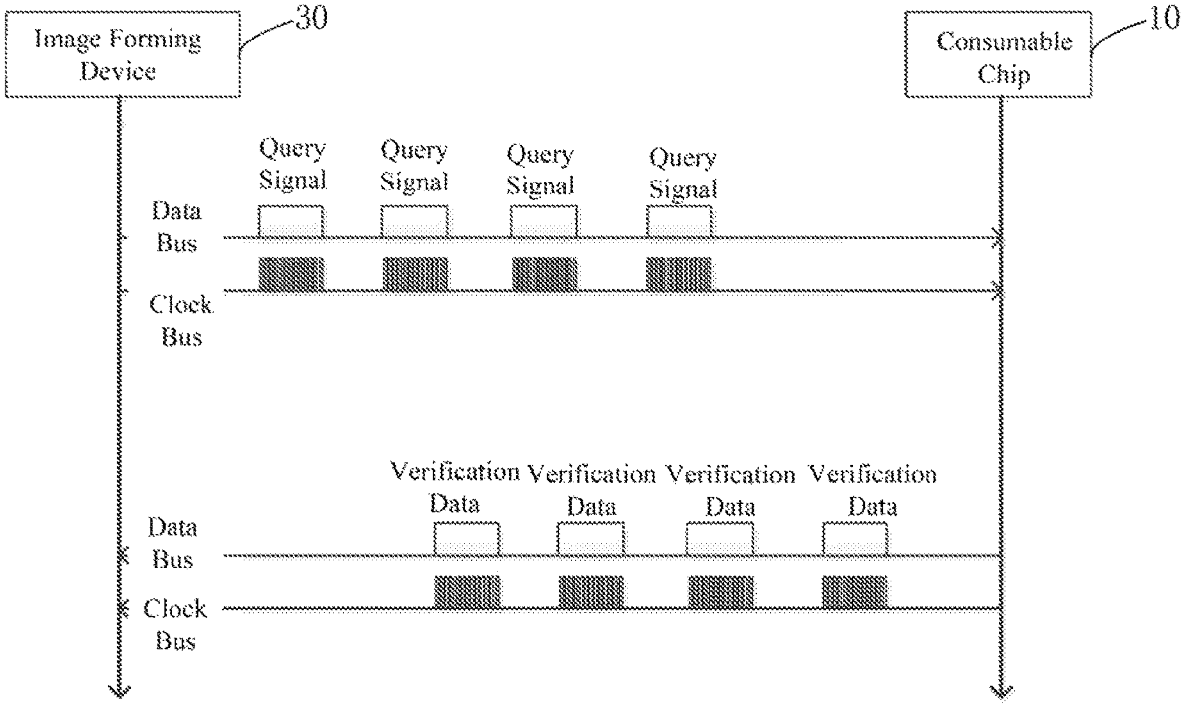
FIG. 7 is a schematic diagram of communication steps between a consumable chip and an image forming device according to certain embodiment(s) of the present disclosure.

In view of FIG. 7, description is provided below in relation to a handshake scene between the image forming device and the consumable chip.

The communication between the image forming device and the consumable chip is performed according to an agreed communication protocol. The image forming device generates a clock signal. In certain embodiment(s), the clock signal is the first time information, and based on the first time information, the command and data, that is, the query signal, are sent to the data bus. The consumable chip receives the command and data, and clock signals of the command and data are timed to obtain the first time information. The consumable chip analyzes the content of the command and data, and determines whether the content of the command and data is valid according to the communication protocol. When the content of the command and data is valid, the consumable chip obtains the response signal corresponding to the command and data, and processes the response signal and the first time information according to the preset algorithm to obtain the verification data, and the consumable chip sends the verification data to the data bus. The image forming device reads the verification data within the agreed time, the image forming device parses the verification data to obtain the response signal, compares the response signal with the preset response signal and compares the first time information with the preset first time information. When the first time information is consistent with the preset first time information, it means that the time is correct, and the data content is further verified. When the response signal is consistent with the preset response signal, the consumable meets the preset requirement, and the device determines to use this consumable for imaging. When the contents of the command and data are invalid, the consumable chip sends a response value corresponding to the parsing error to the data bus, and the image forming device performs subsequent processing of the communication error.

The first time information includes the first transmission time of each byte of binary data in the received query signal and the second transmission time of adjacent two bytes of binary data.

In certain embodiment(s), the consumable chip's processing the response signal based on preset rules to generate verification data, and sending the verification data to the image forming control unit includes sending, by the consumable chip, the verification data to the image forming device based on the preset clock signal and the preset time information.

The verification data includes multiple data bits. The preset clock signal includes multiple clock cycles, and each clock cycle includes an ascending edge and a descending edge. Each data bit corresponds to a high level signal or a low level signal. The preset time information includes a first preset time and a second preset time, where the first preset time is the extension time corresponding to the hold time of the high level signal, and the second preset time is the extension time corresponding to the hold time of the low level signal. The first preset time is shorter than the time between the descending edge of the current clock cycle and the ascending edge of the next clock cycle, and the second preset time is shorter than the time between the descending edge of the current clock cycle and the ascending edge of the next clock cycle.

In certain embodiment(s), determining, by the image forming control unit, as to whether the consumable meets the preset requirement based on the verification data includes: generating, by the image forming control unit, a preset clock signal for the consumable chip to send verification data; and measuring, by the image forming control unit, the level holding time of the verification data based on the preset clock signal to obtain measurement time information. The image forming control unit also determines whether the measurement time information is correct. When the measurement time information is correct, the image forming control unit parses the verification data, and determines that the consumable is a consumable that meets a preset requirement, thereby determining that the consumable is used for imaging.

The verification data includes multiple data bits. The preset clock signal includes a plurality of clock periods. Each data bit corresponds to a high level signal or a low level signal. The measurement time information includes a third preset time and a fourth preset time, where the third preset time is the extension time corresponding to the hold time of the high level signal, and the fourth preset time is the extension time corresponding to the hold time of the low level signal.

In view of FIG. 5, description is provided on a communication scenario between an image forming device and a consumable chip according to certain embodiment(s).

The communication between the image forming device and the consumable chip is performed according to an agreed communication protocol. The image forming device generates a clock signal and sends command and data to the data bus. The consumable chip receives the command and data, parses the contents of the command and data, and determines whether the contents of the command and data are valid according to the communication protocol. When the contents of the command and data are valid, the consumable chip acquires a response signal corresponding to the command and data. The image forming control unit generates a preset clock signal for sending of verification data by the consumable chip. The consumable chip extends the high level and low level hold times of the response signal according to the preset clock signal and the preset time information, to obtain verification data, and sends the verification data to the data bus based on the preset clock signal. The image forming control unit measures the level hold time of the verification data according to the preset clock signal, to obtain measurement time information. The measurement time information includes a third preset time and a fourth preset time. The third preset time is the extension time corresponding to the hold time of the high level signal, and the fourth preset time is the extension time corresponding to the hold time of the low level signal. When the measurement time information is correct, the image forming control unit parses the verification data to obtain the response signal. When the measurement time information is correct and the response signal is correct, the image forming control unit determines that the consumable is a consumable that meets the preset requirement, thereby determining that the consumable is used for imaging; otherwise, the image forming control unit performs subsequent processing of communication errors.

The image forming control unit compares the measurement time information with the preset time information. When the measurement time information is the same as the preset time information, then the measurement time information is correct, otherwise the measurement time information is incorrect.

In the image forming control method described herein according to certain embodiment(s) of the present disclosure, the verification data is generated by processing the response signal according to preset rules, so that the verification data received by the image forming device includes both the response signal and auxiliary verification data obtained according to the response signal, thereby enabling an improvement on the reliability and flexibility of image forming device for consumable chip verification.

Features of the image forming control method are described herein elsewhere in relation to the consumable chip and the image forming device. These features are not repeated here for brevity.

Various technical features described herein may be combined in any suitable way. In the interest of providing a concise description, not all possible combinations of the various technical features are detailed. However, as long as the combinations do not pose unwanted contradictions, the combinations of the technical features are within the scope of the present disclosure.

The embodiments described herein demonstrate several implementation modes of the present disclosure. The description thereof is relatively specific and detailed, and the description should not be construed as limiting the scope of the present disclosure. Those skilled in the art may make modifications and improvements without having to depart from the concept of the present disclosure. These modifications and improvements all belong to the protection scope of the present disclosure. The scope of protection of the patent disclosure is based on the appended claims.

What is claimed is:

1. A consumable chip, the consumable chip being detachably installed on a consumable, and the consumable being detachably installed on an image forming device including an image forming control unit, the consumable chip comprising:

a chip control unit, configured to:
- obtain a response signal according to a query signal;
- process the response signal according to a preset rule to generate verification data; and
- send the verification data to the image forming control unit according to a preset clock signal and preset time information, the verification data being used by the image forming control unit to determine whether the consumable satisfies a preset requirement, wherein:
- the verification data includes multi-bit data;
- the preset clock signal includes a plurality of clock cycles, and each of the plurality of clock cycles includes an ascending edge and a descending edge;

each bit of the multi-bit data corresponds to a high level signal or a low level signal; and
- the preset time information includes a first preset time and a second preset time, the first preset time is an extension time corresponding to a hold time of the high level signal, the second preset time is an extension time corresponding to a hold time of the low level signal, the first preset time is less than a time between the descending edge of a current clock cycle and the ascending edge of a next clock cycle, and the second preset time is less than a time between the descending edge of the current clock cycle and the ascending edge of the next clock cycle.

2. The consumable chip according to claim 1, wherein the response signal includes N-bit data bits, and the chip control unit is further configured to increase a number of data bits per bit to M bits, and arrange N*M data bits according to the preset rule to generate the verification data.

3. The consumable chip according to claim 1, wherein the chip control unit is configured to obtain first time information corresponding to the query signal as received, and determine the verification data using a preset algorithm according to the response signal and the first time information.

4. The consumable chip according to claim 1, wherein the consumable comprises:

a housing;

a developer container, located in the housing, for containing a developer; and the consumable chip.

5. The consumable chip according to claim 4, wherein the consumable further comprises:

a developer feeding member used to convey the developer.

6. The consumable chip according to claim 5, wherein the consumable further comprises:

a photosensitive drum; and a charging roller for charging the photosensitive drum.

7. The consumable chip according to claim 1, wherein the consumable comprises:

a photosensitive drum;

a charging roller for charging the photosensitive drum; and the consumable chip.

8. An image forming control method, applied to a consumable chip including a chip control unit and installed on a consumable of an image forming device including an image forming control unit, comprising:

obtaining a response signal according to a query signal;

processing the response signal according to a preset rule to generate verification data; and sending the verification data to the image forming control unit according to a preset clock signal and preset time information, the verification data being used by the image forming control unit to determine whether the consumable satisfies a preset requirement, wherein:

the verification data includes multi-bit data;

the preset clock signal includes a plurality of clock cycles, and each of the plurality of clock cycles includes an ascending edge and a descending edge;

each bit of the multi-bit data corresponds to a high level signal or a low level signal; and the preset time information includes a first preset time and a second preset time, the first preset time is an extension time corresponding to a hold time of the high level signal, the second preset time is an extension time corresponding to a hold time of the low level signal, the first preset time is less than a time between the descending edge of a current clock cycle and the ascending edge of a next clock cycle, and the second preset time is less than a time between the descending edge of the current clock cycle and the ascending edge of the next clock cycle.

9. The image forming control method according to claim 8, wherein:

the response signal includes N-bit data bits, and the chip control unit increases a number of data bits per bit to M bits, and arranges the N*M data bits according to a preset arrangement to generate the verification data; and when using the verification data to determine whether the consumable satisfies the preset requirement, the image forming control unit analyzes the verification data to obtain analysis data in which N*M bits are arranged according to the preset arrangement, and compares the analysis data with preset analysis data, and determines, when the analysis data is consistent with the preset analysis data, that the consumable satisfies the preset requirement.

10. The image forming control method according to claim 8, wherein:

the chip control unit obtains first time information corresponding to the query signal, and determines the verification data according to a preset algorithm based on the response signal and the first time information;

when the verification data is used to determine whether the consumable satisfies the preset requirement, the image forming control unit generates the first time information for sending the query signal, and analyzes the verification data to obtain the response signal; compares the response signal with a preset response signal and compares the first time information with preset first time information, and when the response signal is consistent with the preset response signal and the first time information is consistent with the preset first time information, determines that the consumable is a consumable that satisfies the preset requirement.

11. The image forming control method according to claim 8, when the verification data is used to determine whether the consumable satisfies the preset requirement, the image forming control unit is further configured to generate the preset clock signal for the chip control unit to send the verification data and measure a holding time of the verification data based on the preset clock signal to obtain measurement time information;

judge whether the measurement time information is correct, and if the measurement time information is correct, analyze the verification data, and determine that the consumable satisfies the preset requirement.

* * * * *